(12) United States Patent
Shiraki

(10) Patent No.: US 8,428,262 B2
(45) Date of Patent: Apr. 23, 2013

(54) METHOD TO CONNECT WIRELESS COMMUNICATION DEVICE, WIRELESS COMMUNICATION DEVICE, AND COMPUTER USABLE MEDIUM THEREFOR

(75) Inventor: Tomomi Shiraki, Aichi (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 738 days.

(21) Appl. No.: 12/569,214

(22) Filed: Sep. 29, 2009

(65) Prior Publication Data

US 2010/0082980 A1    Apr. 1, 2010

(30) Foreign Application Priority Data

Sep. 30, 2008   (JP) .................... 2008-255674

(51) Int. Cl.
*H04K 1/00* (2006.01)
*H04L 9/32* (2006.01)
*H04L 29/06* (2006.01)
*G06F 21/00* (2006.01)

(52) U.S. Cl.
USPC ............ 380/270; 713/168; 713/182; 726/3

(58) Field of Classification Search .................. None
See application file for complete search history.

(56) References Cited

U.S. PATENT DOCUMENTS

| | | | |
|---|---|---|---|
| 2005/0148326 A1 | 7/2005 | Nogawa et al. | |
| 2006/0106918 A1 | 5/2006 | Evert et al. | |
| 2006/0246946 A1 | 11/2006 | Moritomo et al. | |
| 2007/0192596 A1 | 8/2007 | Otsuka | |
| 2008/0086760 A1* | 4/2008 | Jiang et al. | 726/3 |
| 2008/0163343 A1 | 7/2008 | Kudo | |
| 2009/0052500 A1* | 2/2009 | Bush et al. | 375/145 |

FOREIGN PATENT DOCUMENTS

| | | |
|---|---|---|
| JP | 2004-180010 | 6/2004 |
| JP | 2005-174134 | 6/2005 |
| JP | 2006-141012 | 6/2006 |
| JP | 2006-279848 | 10/2006 |
| JP | 2006-309458 | 11/2006 |
| JP | 2007-151195 | 6/2007 |
| JP | 2008-165444 | 7/2008 |

OTHER PUBLICATIONS

Japanese Official Action dated Feb. 8, 2011 together with an English language translation.
Japanese Official Action dated Aug. 18, 2010 together with an English language translation.

* cited by examiner

*Primary Examiner* — Philip Chea
*Assistant Examiner* — Fatoumata Traore
(74) *Attorney, Agent, or Firm* — Scully, Scott, Murphy & Presser, P.C.

(57) ABSTRACT

A method to connect a wireless communication device to an intended wireless network is provided. The method includes a first step, in which options of authorization methods are presented to be selectable to a user, a second step, in which a first authorization method is automatically selected if an option of a third authorization item is selected, a third step, in which options of encryption methods corresponding to the selected first authorization method are presented to be selectable to the user, a fourth step, in which a first encryption method is automatically selected if a third encryption item is selected, and a fifth step, in which establishment of the connection is attempted by use of the selected first authorization method and the selected first encryption method.

6 Claims, 8 Drawing Sheets

| Installation of wireless settings |
|---|
| Searching for wireless networks... |

FIG.3A

| Select a wireless network. |
|---|
| <Manual input> |
| SSID0001 |
| SSID0002 |
| SSID0003 |

FIG.3B

| Select an authorization method. |
|---|
| <Auto select> |
| Open |
| Shared Key |
| WPA-PSK |
| LEAP |

FIG.3C

| Establishment of connection is attempted with the authorization method LEAP and the encryption method CKIP. Enter a user name and a password for the authorization server. |
|---|
| <Prefer different method> |
| User name: Password: |

FIG.3D

| Establishment of connection is attempted with the authorization method WPA-PSK. Select an encryption method. |
|---|
| <Auto select> |
| TKIP AES |

FIG.3E

| Establishment of connection is attempted with the authorization method WPA-PSK and the encryption method AES. Enter a passphrase.(8-64 characters) |
|---|
| <Prefer different method> |
| Passphrase: |

FIG.3F

| Establishing connection with the authorization method WPA-PSK and the encryption method AES... |
|---|
| |

FIG.3G

| Failed in establishing connection with the authorization method WPA-PSK and the encryption method AES. |
|---|
| <Next> |

FIG.3H

| Establishment of connection is attempted with the authorization method WPA-PSK and the encryption method TKIP. Enter a passphrase.(8-64 characters) |
|---|
| <Prefer different method> |
| Passphrase: |

FIG.3I

| Establishing connection with the authorization method WPA-PSK and the encryption method TKIP. |
|---|
| |

FIG.3J

METHOD TO CONNECT WIRELESS COMMUNICATION DEVICE, WIRELESS COMMUNICATION DEVICE, AND COMPUTER USABLE MEDIUM THEREFOR

CROSS REFERENCE TO RELATED APPLICATION

This application claims priority from Japanese Patent Application No. 2008-255674, filed on Sep. 30, 2008, the entire subject matter of which is incorporated herein by reference.

BACKGROUND

1. Technical Field

The present invention relates to a wireless communication device to be connected to a network and a method to connect the wireless communication device with a network.

2. Related Art

A wireless LAN (local area network) has been widespread and utilized in network computing environment. Hereinafter, the wireless LAN will be referred to as a wireless network. Specifically in the wireless network, security of information exchanged therein is often threatened. Therefore, in many cases, security in the wireless network is enhanced by authorization and encryption; a wireless communication device to be connected to the wireless network is required to be authorized, and information exchanged in the wireless network is encrypted. Methods for authorization include, for example, Shared-key authorization, WPA (Wi-Fi Protected Access)-PSK (Pre-Shared Key), and WPA2-PSK. Alternatively to these methods, the wireless network may operate in "open authorization" method, in which no authorization is required for communication. Methods for encryption include, for example, WEP (Wired Equivalent Privacy), TKIP (Temporal Key Integrity Protocol), and AES (Advanced Encryption Standard). Alternatively to these methods, the wireless network may operate in "no encryption" method, in which no encryption is required for communication.

When a wireless communication device is connected with the wireless network, the wireless communication device is required to have predetermined wireless settings installed. If the wireless network is protected by authorization and/or encryption, the wireless communication device is required to have the settings for the authorization/encryption methods installed.

The settings for authorization and encryption in the wireless network are often complicated and difficult for users to deal with. Therefore, easier methods to connect a wireless communication device with the wireless network have been sought. For example, WPS (Wi-Fi Protected Setup), which is a known technology to install wireless settings fully automatically, is suggested by Wi-Fi Alliance. The full-automatic installation reduces burden on users but requires the wireless communication device to be complied with the methods for automatic settings such as WPS.

SUMMARY

Thus, methods to easily install the settings for wireless communication, which require less burden on users, have yet been sought in the widespread wireless network environment.

In view of the above, the present invention is advantageous in that a method to connect the wireless communication device to the wireless network easily is provided. Further, a wireless communication device, which can be connected to the wireless network easily with reduced burden on users, is provided. Furthermore, a computer usable medium storing computer readable instructions to manipulate the wireless communication device to be connected with the wireless network is provided.

BRIEF DESCRIPTION OF THE ACCOMPANYING DRAWINGS

FIGS. 3A-3J are illustrative views of user interfaces to be presented to a user in a wireless connection establishing process according to the embodiment of the present invention.

DETAILED DESCRIPTION

Hereinafter, an embodiment according to an aspect of the present invention will be described with reference to the accompanying drawings.

Firstly, an overall configuration of a network system including a wireless network 10 according to the embodiment of the present invention will be described. The wireless network 10 includes an access point 300A and an MFP (multifunction peripheral) 100. The MFP 100 is equipped with a plurality of functions to, for example, print, scan, and/or copy images. The MFP 100 is connected to a PC (personal computer) 400 within the wireless network 10 through the access point 300A, a wired LAN 600, and a hub 620. The MFP 100 can receive print data transmitted from the PC 400 to print and transmits image data representing a scanned image to the PC 400.

Figure 2:
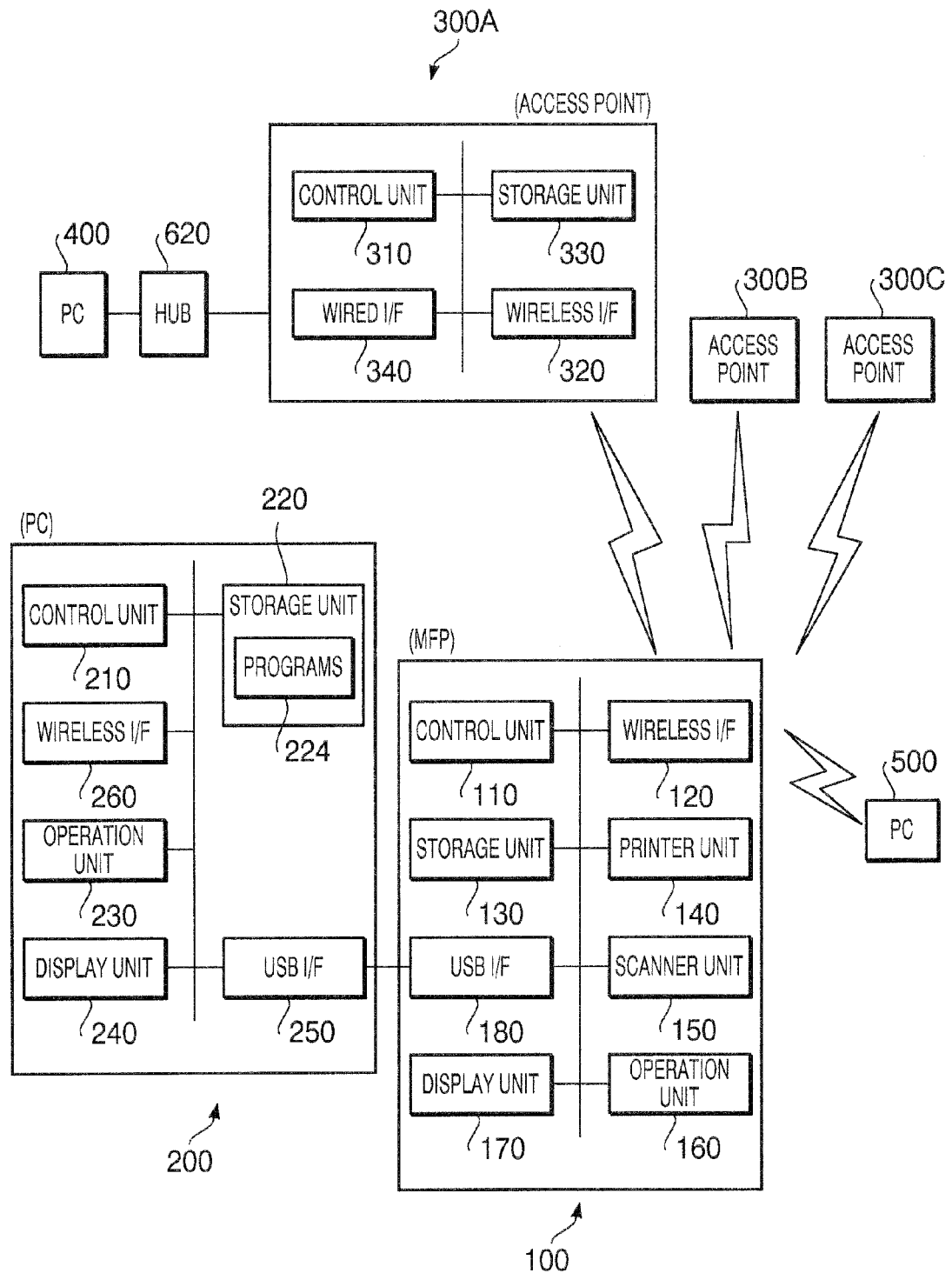
FIG. 2 is a block diagram to illustrate the network system 10 with device components according to the embodiment of the present invention.

The MFP 100 is further connected with a PC 200 through an USB (universal serial bus) interface (I/F) 180 (see FIG. 2). The PC 200 can process the wireless settings which are to be installed in the MFP 100. The connection between the MFP 100 and the PC 200 is not limited to the USB interfaces 180, 250 (see FIG. 2), but may be achieved through, for example, a wired LAN cable. When the PC 200 is equipped with a wireless interface, for another example, the connection may be achieved through ad-hoc wireless communication.

Figure 1:
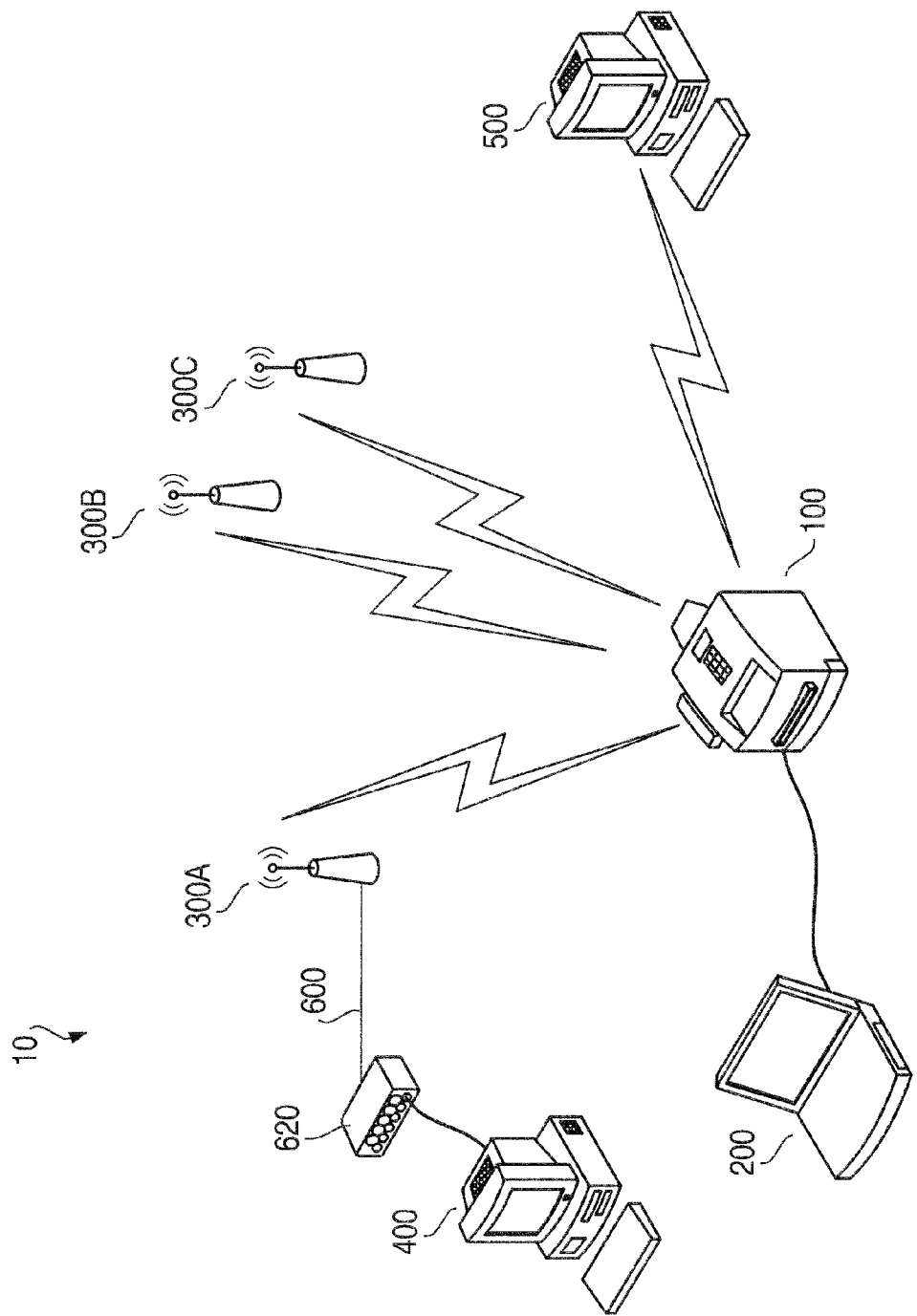
FIG. 1 is a schematic diagram to illustrate a network system 10 according to an embodiment of the present invention.

The wireless network 10 further has a plurality of access points, including access points 300B and 300C in addition to the access point 300A. Furthermore, a PC 500 having a wireless interface is wirelessly connected with the wireless network 10. In the following description, a communication mode for wireless connection achieved through the access points 300A, 300B, and 300C will be referred to as infrastructure mode. On the other hand, a communication mode for wireless connection achieved by two devices, which communicate with each other directly, will be referred to as ad-hoc mode. In FIG. 1, for example, when the PC 500 and the MFP 100 communicate directly with each other, and when print data transmitted from the PC 500 is received by the MFP 100, the communication mode for the data transmission is ad-hoc mode.

Referring to FIG. 2, the device components in the network system 10 according to the present embodiment will be described. According to the present embodiment, the access points 300B, 300C are configured to have same functionalities as the access point 300A and therefore serve similarly to the access point 300A in the network system. Therefore, detailed description and illustration of the access points 300B, 300C are represented by those of the access point 300A. The PCs 400 and 500 are configured substantially similarly to the PC 200; therefore, description and illustration of the PCs 400 and 500 are represented by those of the PC 200.

The configuration of the MFP 100 will be described. The MFP 100 includes a control unit 110, a wireless interface (I/F) 120, a storage unit 130, a printer unit 140, a scanner unit 150, an operation unit 160, a display unit 170, and a USB interface 180. The control unit 110 controls behaviors of the MFP 100 itself. The control unit 110 includes, for example, a CPU being an arithmetic processor, a ROM to store various programs to manipulate the MFP 100, and a RAM being a workspace for the processor. When the CPU runs a program stored in the ROM, operations to manipulate the MFP 100 are performed. In this regard, various data, for example, data exchanged with an external device through the wireless interface 120 and entered through the operation unit 160, is stored in the RAM. The stored data is processed by the CPU which accesses the RAM. The CPU develops the programs stored in the ROM in the RAM to run so that the MFP 100 is controlled to provide its functions to the user.

The wireless interface 120 in the MFP 100 is an interface to connect the MFP 100 to, for example, the access point 300A wirelessly in the infrastructure mode and to the PC 500 wirelessly in the ad-hoc mode. The storage unit 130 is a data storage to store information concerning wireless communication settings of the MFP 100 and may be a non-volatile storage (e.g., an EEPROM) and a hard disk. The printer unit 140 prints an image according to image data, for example, transmitted from the PC 400 or entered through the scanner unit 150. The scanner unit 150 scans an image formed on an original document which is placed on a document holder (not shown). The operation unit 160 provides an interface for data input to a user and includes, for example, input keys such as direction keys, numerical keys, an enter key, and a cancel key. The display unit 170 displays various information concerning operations in the MFP 100. The USB interface (I/F) 180 provides an interface to other USB-enabled devices to be connected with the MFP 100.

The MFP 100 according to the present embodiment is configured to support a plurality of authorization methods, which are open authorization, shared-key authorization, WPA-PSK, WPA2-PSK, and LEAP, and a plurality of encryption methods, which are WEP, TKIP, AES, and CKIP. The MFP 100 is also capable of communicating with an external device without encryption. Applicable combinations of the authorization methods and the encryption methods will be described later with reference to FIG. 7.

The configuration of the PC 200 will be described. The PC 200 is a known personal computer and includes a control unit 210, a storage unit 220, an operation unit 230, a display unit 240, a USB interface 250, and a wireless interface (I/F) 260. The control unit 210 includes, for example, a CPU, a ROM, and a RAM and controls behaviors of the PC 200 itself. The storage unit 220 is a data storage to store programs 224 which are run to install the wireless settings of the PC 200. The storage unit 220 may be, for example, a hard disk. The CPU in the control unit 210 processes data, which is entered through the USB interface 250 and the operation unit 230, stored in the ROM, and develops the programs 224 stored in the storage unit 220 in the RAM to run, the PC 200 is controlled to provide its functions to the user.

The operation unit 230 provides an input interface to the user entering instructions for running the programs 224 to the PC 200. The operation unit 230 includes, for example, a keyboard and a mouse. The display unit 240 displays information concerning operations performed in the PC 200. The USB interface 250 provides an interface to connect the PC 200 to USB-enabled external devices. Further, The PC 200 includes the wireless interface 260, which provides an interface to connect the PC 200 with external devices wirelessly in the infrastructure mode or in ad-hoc mode.

The configuration of the access point 300A will be described. The access point 300A is a known access point and includes a control unit 310, a wireless interface (I/F) 320, a storage unit 330, and a wired interface (I/F) 340. The control unit 310 includes a CPU, a ROM, and a RAM and controls behaviors of the access point 300A. The wireless interface 320 provides an interface to external devices to be wirelessly connected with the access point 300A. Data to be exchanged with the external devices is transmitted and received through the wireless interface 320. The storage unit 330 is a data storage to store information concerning wireless communication settings of the access point 300A. The information to be stored includes an SSID (Service Set Identifier) being an identifier to identify the wireless network, a valid authentication method, an encryption method, and a passphrase for the network. The storage unit 330 may be, for example, an EEPROM. The wired interface 340 is an interface to connect the access point 300A with wired LAN 600.

Hereinafter, an embodiment of processes concerning connection of the MFP 100 with the wireless network 10 will be described. Wireless connection between, for example, the access point 300A and the MFP 100 is established when the processes complete. Thereafter, the MFP 100 is allowed to communicate with the PC 400 to receive, for example, print data transmitted from the PC 400 to print and transmit image data scanned by the scanner unit 150 of the MFP 100 to the PC 400.

Firstly, user interfaces to be presented to a user through the display unit 170 of the MFP 100 will be described with reference to FIGS. 3A-3J and 4A-4J. The user interfaces are displayed during a main flow to establish connection between the MFP 100 and the access point 300A. In the following description, an example in which the user does not select any specific authorization method (FIGS. 3A-3J) and an example in which the user selects a specific authorization method (FIG. 4A-4J) will be described.

The example in which the user does not select any specific authorization method will be described. In the present example, the user is not aware of an authorization method employed in a wireless network including the access point 300A. FIG. 3A illustrates a user interface to be presented to the user when the MFP 100 is searching for wireless networks provided in the vicinity of the MFP 100. A message indicating that the MFP 100 is in progress to detect the wireless networks is presented to the user through the display unit 170.

FIG. 3B illustrates a user interface to be presented to the user when the search for the wireless network completed. In the user interface, a list of SSIDs (SSID0001-SSID0003) representing the detected wireless networks is displayed. The user is prompted to select one of the SSIDs of a wireless network, to which the MFP 100 should be connected. Optionally, the user may manually input an SSID to which the MFP 100 should be connected. In this regard, the user is required to enter the user's intended option of manual input through the operation unit 160. In the present embodiment, therefore, the user interface shown in FIG. 3B has an indication <Manual input>, which is operated (e.g., clicked on) by the user to enter the option of manual input.

FIG. 3C illustrates a user interface through which the user enters selection of an authorization method to be employed in an attempt to establish connection with the selected wireless network. The selected wireless network refers to the wireless network represented by the SSID selected through the user interface shown in FIG. 3B or manually entered by the user through the operation unit 160. The user interface shown in FIG. 3C presents authorization methods supported by the MFP 100 and an indication <Auto select>. The indication <Auto select> is an option for the user to select when, for example, the user is unaware of a suitable authorization method for the attempt to establish connection. In the user interface shown in FIG. 3C, the option <Auto select> is selected.

FIG. 3D illustrates a user interface to be displayed when the user enters the option of <Auto select> through the user interface shown in FIG. 3C. In the user interface, a message indicating that the MFP 100 will attempt to establish connection with the selected wireless network by use of an authorization method: "LEAP" and an encryption method: "CKIP" is displayed. In the present embodiment, LEAP is an authorization method with a security standard being the highest among the authorization methods applicable to the MFP 100 and displayed in the user interface shown in FIG. 3C. Meanwhile, CKIP is an encryption method to be employed in combination with LEAP. Further, in the user interface shown in FIG. 3D, a massage to prompt the user to enter a user name and a password is displayed. Furthermore, an indication <Prefer different method> is displayed. The indication <Prefer different method> is an option for the user when the user opts to skip the combination of "LEAP and CKIP" and use a different combination of an authorization method and an encryption method in the attempt to establish connection.

FIG. 3E illustrates a user interface to be displayed when the user enters the option of <Prefer different method> through the user interface shown in FIG. 3D. In the user interface, a message indicating that the MFP 100 will attempt to establish connection by use of a different authorization method "WPA-PSK" is displayed. In the present embodiment, WPA-PSK is an authorization method with a security standard being a second highest among the authorization methods applicable to the MFP 100. Further, encryption methods applicable in combination with WPA-PSK are displayed. The user may select one of the encryption methods to be used in the attempt to establish connection with the wireless network. Furthermore, an indication <Auto select> is displayed for the user who may be unaware of a suitable encryption method for the authorization method WPA-PSK.

FIG. 3F illustrates a user interface to be displayed when the user selects an encryption method "AES" or <Auto select> through the user interface shown in FIG. 3E. In the user interface, a message indicating that the encryption method "AES" is currently selected and the MFP 100 will attempt to establish connection by use of the selected authorization method is displayed. In the present embodiment, when the option <Auto select> is entered through the user interface shown in FIG. 3E, the encryption method "AES" is adopted automatically for the next selection. The flow of automatic adoption will be described later in detail. Further, in the user interface shown in FIG. 3F, a message to prompt the user to enter a passphrase is displayed. The passphrase is a preset phrase to allow the MFP 100 to be connected with the wireless network. Therefore, the user interface shown in FIG. 3F is provided with an entry field, in which the passphrase is entered by the user. Furthermore, the indication <Prefer different method> is presented for the user when the user opts to skip the combination of "WPA-PSK and AES" and use a different set of an authorization method and an encryption method. When the option <Prefer different method> is entered, a user interface, for example, shown in FIG. 3I is displayed in the display unit 170.

FIG. 3G illustrates a user interface to be displayed when the passphrase is entered through the user interface shown in FIG. 3F. A message indicating the MFP 100 is in attempt to establish connection with the wireless network represented by the SSID selected through the user interface shown in FIG. 3B by use of the set of "WPA-PSK and AES" is displayed.

FIG. 3H illustrates a user interface, which indicates failure of the attempt to establish connection by use of the set selected through the user interface shown in FIG. 3G. Further, the user interface includes an indication <Next>, which is an option for the user when the user opts to continue attempting to establish connection by use of a different set of an authorization method and an encryption method. When the option <Next> is selected through the user interface shown in FIG. 3H, a user interface shown in FIG. 3I is displayed.

FIG. 3I illustrates a user interface to be displayed when the option <Prefer different method> is selected through the user interface shown in FIG. 3F and when the option <Next> is selected through the user interface shown in FIG. 3H. A message indicating that the authorization method "WPA-PSK" and an encryption method "TKIP" are currently selected and the MFP 100 will attempt to establish connection by use of the selected set is displayed. Further, a message to prompt the user to enter a passphrase is displayed. The user interface shown in FIG. 3I is provided with an entry field, in which the passphrase is entered by the user. Furthermore, the indication <Prefer different method> is presented for the user when the user opts to skip the set of "WPA-PSK and TKIP" and use a different set of an authorization method and an encryption method. When the option <Prefer different method> is selected, a user interface (not shown) to present the user adoption of a next set "Shared-key and WEP" is displayed in the display unit 170.

FIG. 3J illustrates a user interface to be displayed when the passphrase is entered through the user interface shown in FIG. 3I. A message indicating the MFP 100 is in attempt to establish connection with the wireless network represented by the SSID selected through the user interface shown in FIG. 3B by use of the set of "WPA-PSK and TKIP."

Figure 4A:
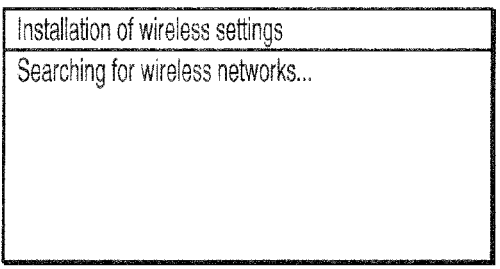
FIGS. 4A-4J are illustrative views of user interfaces to be presented to the user in the wireless connection establishing process according to the embodiment of the present invention.
Figure 4F:
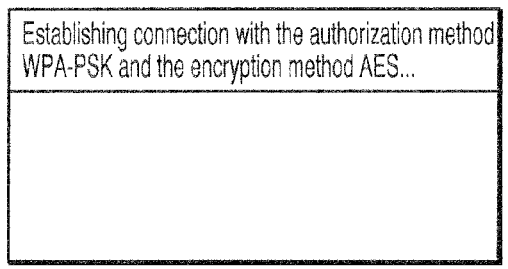
Figure 4B:
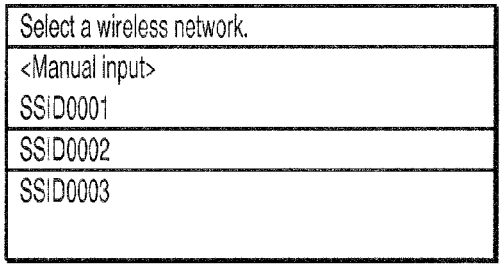

The example in which the user is aware of an authorization method employed in the wireless network including the access point 300A and selects the specific authorization method will be described. In this regard, FIGS. 4A and 4B illustrate user interfaces identical to FIGS. 3A and 3B respectively; therefore, description of those will be omitted.

Figure 4G:
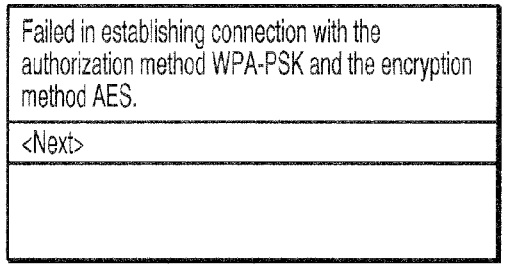
Figure 4C:
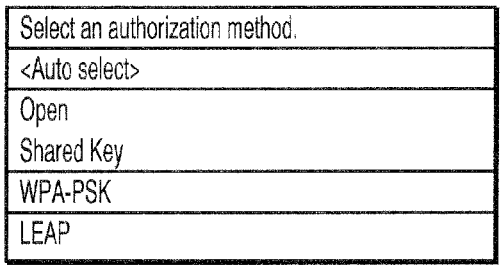

FIG. 4C illustrates a user interface through which the user enters selection of the authorization method to be employed in an attempt to establish connection with the selected wireless network. The selected wireless network refers to the wireless network represented by the SSID selected through the user interface shown in FIG. 4B or manually entered by the user. The user interface further includes an indication <Auto select>, which is an option for the user to select when, for example, the user is unaware of a suitable authorization method and an encryption method for the MFP 100 to attempt to establish connection. In the user interface shown in FIG. 4C, an authorization method "WPA-PSK" is currently selected.

Figure 4H:
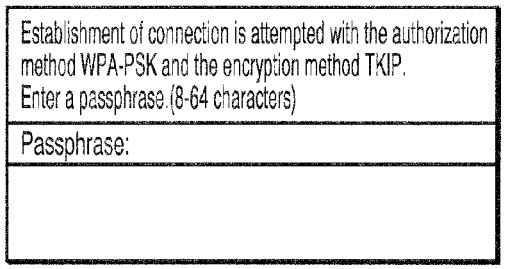
Figure 4D:
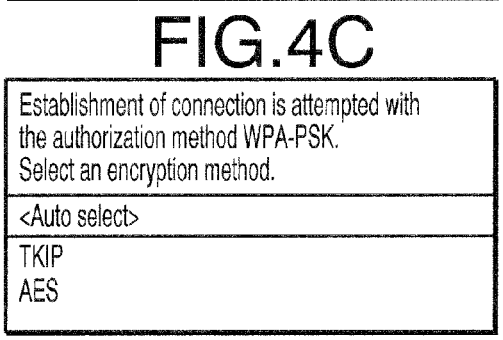
Figure 4I:
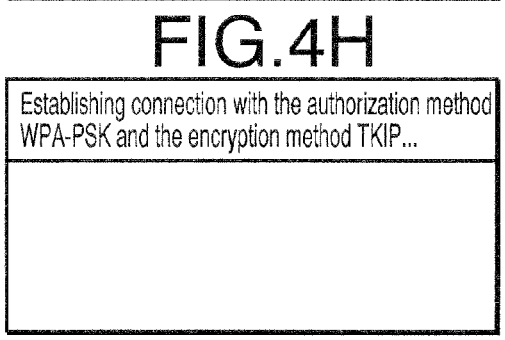
Figure 4E:
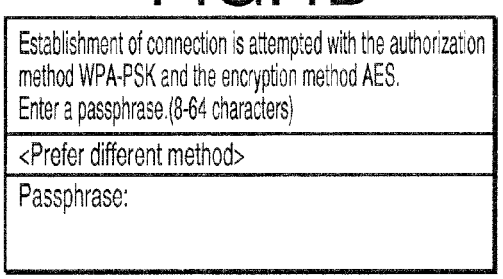

FIG. 4D illustrates a user interface to be displayed when the user enters the selection of the authorization method "WPA-PSK." FIG. 4E illustrates a user interface to be displayed when the user selects the encryption method "AES" or <Auto select> through the user interface shown in FIG. 4D. The user interface shown in FIG. 4E includes an indication <Prefer different method>, which is an option for the user when the user opts to skip the set of "WPA-PSK and AES" and use a different set of an authorization method and an encryption method. When the user selects the option <Prefer different method>, a user interface shown in FIG. 4H, which will be described later, is displayed in the display unit 170. Further, in the user interface shown in FIG. 4E, a message to prompt the user to enter a passphrase is displayed. FIG. 4F is a user interface to be displayed when the passphrase is entered through the user interface shown in FIG. 4E. A message indicating the MFP 100 is in attempt to establish connection with the wireless network represented by the SSID selected through the user interface shown in FIG. 4B by use of the set of "WPA-PSK and AES" is displayed. FIG. 4G illustrates a user interface, which indicates failure of the attempt to establish connection by use of the set selected through the user interface shown in FIG. 4G. Further, the user interface includes an indication <Next>, which is an option for the user when the user opts to continue attempting to establish connection by use of a different set of an authorization method and an encryption method. When the option <Next> is selected through the user interface shown in FIG. 4G, a user interface shown in FIG. 4H is displayed. User interfaces shown in FIGS. 4D, 4E, 4F, and 4G are identical to the user interfaces shown in FIGS. 3E, 3F, 3G, and 3H; therefore, description of those is omitted.

FIG. 4H illustrates a user interface to be displayed when the option <Next> is selected through the user interface shown in FIG. 4G. A message indicating that the authorization method "WPA-PSK" and the encryption method "TKIP" are currently selected and the MFP 100 will attempt to establish connection by use of the selected set is displayed. Further, a message to prompt the user to enter the passphrase is displayed. The user interface shown in FIG. 4G is provided with an entry field, in which the passphrase is entered by the user. The user interface shown in FIG. 4H is similar to the user interface shown in FIG. 3I but different in absence of the indication <Prefer different method>. Presence and absence of the indication <Prefer different method> will be described later in detail.

Figure 4J:
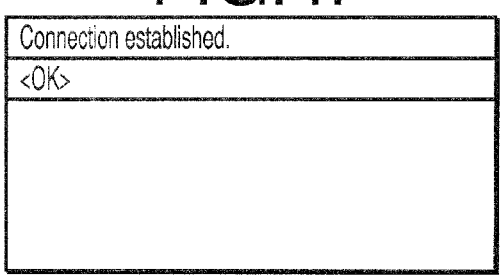

FIG. 4I illustrates a user interface to be displayed when the passphrase is entered through the user interface shown in FIG. 4H. The user interface shown in FIG. 4I is identical to the user interface shown in FIG. 3J; therefore, description of that is omitted. FIG. 4J illustrates a user interface to be displayed when connection with the selected wireless network is established successfully by use of any set of the selected authorization method and the encryption method.

Figure 5:
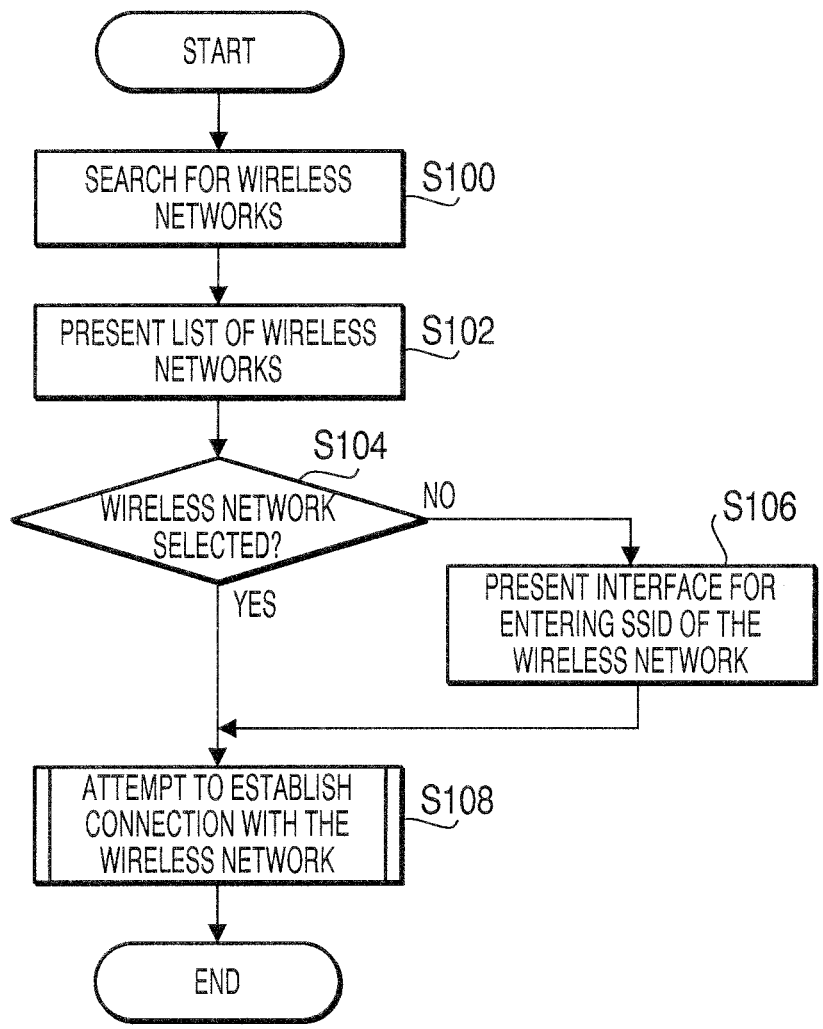
FIG. 5 is a flowchart to illustrate a main flow to establish connection between an MFP (multifunction peripheral) 100 and an access point 300A within the network system 10 according to the embodiment of the present invention.

Next, the main flow of a process to establish connection between the MFP 100 and the access point 300A will be described with reference to FIG. 5. When the user enters an instruction to start the process through the operation unit 160, the control unit 110 obtains the instruction and starts the process. In particular, when the user enters the instruction in the MFP 100 through the operation unit 160 to search for wireless networks, in S100, the control unit 110 obtains the instruction. Further, the control unit 110 manipulates the wireless interface 120 to search for external devices (e.g., the access points 300A-300C and the PC 500) which are provided in the vicinity of the MFP 100 within the wireless networks. In particular, the control unit 110 receives SSIDs which are provided from the external devices. During the search, the control unit 110 displays status (see FIGS. 3A and 4A) indicating that the MFP 100 is in progress to detect the wireless networks in the display unit 170 of the MFP 100.

When the control unit 110 collects the SSIDs received through the wireless interface 120, in S102, the control unit 110 presents a list including the collected SSIDs to the user through the display unit 170 (see FIGS. 3B and 4B). The user is prompted to select one of the SSIDs of a wireless network, to which the MFP 100 should be connected. The control unit 110 waits until the user selects one of the SSIDs. In S104, therefore, the control unit 110 determines as to whether the user selected one of the listed SSIDs. In this regard, however, the user may directly enter a specific SSID to which the MFP 100 should be connected through the operation unit 160. When the user opts to directly enter the specific SSID, the user inputs the option by using (e.g., clicking on) the <Manual input> indication presented in the user interfaces shown in FIGS. 3B and 4B. When the user's option to use <Manual input> is entered (S104: NO), in S106, the control unit 110 displays a user interface (not shown) for the user to enter the SSID in the display unit 170. Thereafter, the flow proceeds to S108. Meanwhile, when the user selects an SSID of the wireless network to which the MFP 100 should be connected among the SSIDs listed in S102 (S104: YES), the flow proceeds to S108. Thus, the control unit 110 obtains the SSID of the wireless network. In S108, the control unit 110 attempts to establish connection with the wireless network 10 represented by the obtained. SSID. The flow ends thereafter.

Next, a flow of the attempt to establish connection with the wireless network in S108 (FIG. 5) will be described with reference to FIG. 6.

Figure 7:
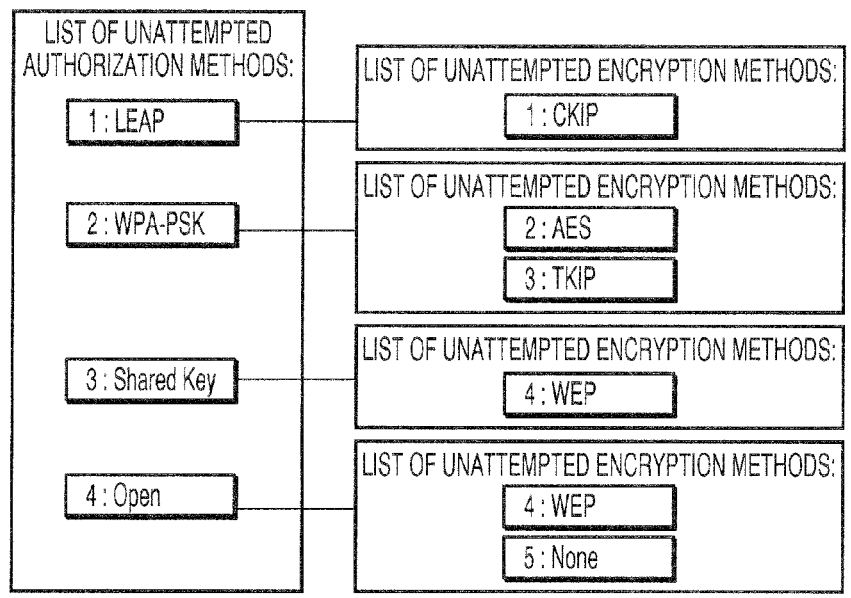
FIG. 7 illustrates a list of unattempted authorization methods and lists of unattempted encryption methods according to the embodiment of the present invention.

When the flow starts, in S200, the control unit 110 creates a list of unattempted authorization methods (see FIG. 7). The unattempted authorization methods are authorization methods which have not yet been used in the attempt to connection with the access point 300A. If all the authorization methods applicable to the MFP 100 have been used in the attempts, the list is empty and does not include any authorization method therein. In FIG. 7, the list of unattempted authorization methods is shown in a left side and includes authorization methods which are applicable to the MFP 100. In the present embodiment, the list of unattempted authorization methods includes LEAP, WPA-PSK, Shared-key authorization, and open authorization. Numerical figures included in the authorization methods indicate priority of the methods. That is, when the numerical figure indicates a smaller number, a security standard of the authorization method is higher.

In S202, the control unit 110 examines the list of unattempted authorization methods to determine as to whether the list is blank. If the list is blank, i.e., the list includes no unattempted authorization method remaining (S202: YES), in S204, the control unit 110 presents a message, indicating that all preceding attempts to establish connection with the access point 300A by use of the applicable authorization methods failed, through the display unit 170. The flow ends thereafter. In the present embodiment, once an authorization method adopting process in S206 (see also FIG. 8) is executed, the list of unattempted authorization method is emptied and becomes blank (see specifically S308 and S310 in FIG. 8).

In S202, when the list of unattempted authorization method includes any unattempted authorization method remaining and is not blank (S202: NO), in S206, the control unit 110 activates the authorization method adopting process.

The flow of the authorization method adopting process is described with reference to FIG. 8. When the flow starts, in S300, the control unit 110 examines the list of unattempted authorization methods and determines as to whether the list includes solely one unattempted authorization method remaining. When a plurality of unattempted authorization methods remain in the list (S300: NO), in S302, the control unit 110 displays a user interface, which presents the indication <Auto select> and the unattempted authorization methods to the user, in the display unit 170. In other words, options <Auto select> and the plurality of unattempted authorization methods are presented to the user to select (see FIGS. 3C and 4C). In the present embodiment, as shown in FIGS. 3C and 4C, the list of unattempted authorizations includes all the authorization methods applicable to the MFP 100. In other words, the user interfaces with the all authorization methods as shown in FIGS. 3C and 4C are displayed when the authorization method adopting process is run for the first time after activation of the process to establish connection between the MFP 100 and the wireless network. If the authorization method adopting process has been run at least for once in the past by use of any one of the applicable authorization method, the once-used authorization method is removed from the list; therefore, the once-used authorization method does not appear in the user interfaces. Removal of the once-used authorization method will be explained later in detail.

In S304, the control unit 110 determines as to whether the user entered the option <Auto select> through the operation unit 160. When the user entered the option <Auto select> (S304: YES), in S306, the control unit 110 adopts one of the unattempted authorization methods. In particular, the control unit 110 automatically adopts an authorization method with the highest priority, i.e., an authorization method with its security standard being highest. Further, the control unit 110 removes the adopted authorization method from the list. According to the user interface shown in FIG. 3C, for example, the authorization method LEAP, which has the highest priority, is adopted and removed from the list firstly. The remaining authorization methods, which are "WPA-PSK," "Shared-key," and "open," are adopted in turn according to the priority when an attempt to establish connection by use of the previously adopted authorization method fails (see S230 in FIG. 6), and the authorization method adopting process in S206 is repeated.

In S304, if the user selects one of the authorization methods presented in the list of unattempted authorization methods through the user interfaces shown in FIG. 3C (or FIG. 4C) (S304: NO) (in the user interface shown in FIG. 4, the authorization method "WPA-PSK" is selected), in S308, the control unit 110 removes all the authorization methods included in the list from the list. In this regard, it is assumed that the user is aware of the authorization method employed in the selected wireless network; therefore, it is not necessary that the control unit 110 attempts to establish connection by use of the other authorization methods.

In S300, if the list of unattempted authorization methods includes solely one unattempted authorization method remaining (S300: YES), in S310, the control unit 110 adopts the remaining authorization method and removes the authorization method from the list. Thus, the list becomes blank. Following any of S306, S308, and S310, the authorization method adopting process ends. The control unit 110 returns to the flow shown in FIG. 6.

Following S206, in S208, the control unit 110 creates a list of unattempted encryption methods specifically for the authorization method adopted in S206 (see FIG. 7). For example, when the authorization method adopting process is run for the first time in S206, and when the option <Auto select> is entered in S308 in FIG. 8 (S304: YES), the control unit 110 automatically adopts the authorization method "LEAP" with the highest priority. Accordingly, in S208, a list including encryption methods corresponding to "LEAP," which is "CKIP" alone, is created. In S304, if the user selects one of the authorization methods presented in the user interface shown in S302 (e.g., "WPA-PAK") (S304: NO), a list including encryption methods corresponding to "WPA-PAK," which are "AES" and "TKIP," is created.

In S210, the control unit 110 examines the list of unattempted encryption methods to determine as to whether the list is blank. If the list is blank, i.e., the list includes no unattempted encryption method (S210: YES), the flow returns to S202. If the list of unattempted encryption methods includes any unattempted encryption method and is not blank (S210: NO), in S212, the control unit 110 activates an encryption method adopting process. In S210, if an affirmative judgment is made (S210: YES) and the flow returns to S202, the flow has experienced S206 for at least once; therefore, at least one of the authorization methods, which was adopted in the previous attempt, has been removed. In this regard, the removed authorization method does not appear in S302 in the list of unattempted authorization methods presented through the display unit 170.

For example, when the flow experiences S206 for the first time, the user interface shown in FIG. 3C may be presented in S302. When the option <Auto select> is entered through the operation unit 160 (S304: YES), the authorization method "LEAP" is adopted automatically among the unattempted authorization methods in the list. Further, the authorization method "LEAP" is removed from the list. Meanwhile, in S208, the applicable encryption method for the authorization method "LEAP" is "CKIP" alone (see FIG. 7). Therefore, in S210, negative judgment is made (S210: NO), and in S410, the encryption method "CKIP" is adopted and removed from the list of unattempted encryption methods. (Steps S400-S410 shown in FIG. 9 will be described later in detail.) When the attempt to establish connection with the wireless network by use of the set of authorization method and encryption method "LEAP and CKIP" fails (S230: NO), the flow returns to S202, and S206 is repeated. In the next cycle, the list of unattempted encryption methods is blank (S210: YES), and the flow returns to S202. When S206 is repeated, in S302, the list of unattempted authorization methods with the options: <Auto select>, "Open," "Shared-key," and "WPA-PSK" is presented. In this regard, the option "LEAP" does not appear in the list. When the option <Auto select> is entered through the operation unit 160 (S304: YES), the authorization method "WPA-PSK" is adopted and removed from the list. Thus, when the attempt to establish connection with the wireless network by use of the "WPA-PSK" in combination with each applicable encryption method fails (S230: NO), in the next cycle, affirmative judgment is made in S210. Thereafter, when S202 is again repeated, in S302, the list of unattempted authorization methods with the options: <Auto select>, "open" and "Shared-key" is presented. In this regard, the authorization methods "LEAP" and "WPA-PSK" do not appear in the list. Following S210, the flow proceeds to S212.

A flow of the encryption method adopting process will be described with reference to FIG. 9. When the flow starts, in S400, the control unit 110 examines the list of unattempted encryption methods and determines as to whether the list includes solely one unattempted encryption method remaining. When a plurality of unattempted encryption methods remain in the list (S400: NO), in S402, the control unit 110 displays a user interface, which presents the indication <Auto select> and the unattempted encryption methods to the user, in the display unit 170. In other words, options <Auto select> and the plurality of unattempted encryption methods are presented to the user to select (see FIGS. 3E and 4D). In the present embodiment, the user interface shown in FIG. 3E is displayed when the user selects the option <Prefer different method> through the user interface shown in FIG. 3D and when the user selects the <Auto select> through the user interface shown in FIG. 3C but selects to skip the combination of "LEAP and CKIP" (i.e., the user eventually selects the option <Prefer different method> through the user interface shown in FIG. 3D). The user interface shown in FIG. 4D is displayed when the user selects the authorization method "WPA-PSK" through the user interface shown in FIG. 4C.

In S404, the control unit 110 determines as to whether the user entered the option <Auto select> through the operation unit 160. When the user entered the option <Auto select> (S404: YES), in S406, the control unit 110 adopts one of the unattempted encryption methods. In particular, the control unit 110 automatically adopts an encryption method with the highest priority, i.e., an encryption method with its security standard being highest. Further, the control unit 110 removes the adopted encryption method from the list. In FIG. 7, numerical figures included in the encryption methods indicate priority of the methods. That is, when the numerical figure indicates a smaller number, a security standard of the encryption method is higher.

In S404, if the user selects one of the encryption methods presented in the list of unattempted encryption methods through the user interfaces shown in S402 (S404: NO), in S408, the control unit 110 removes all the encryption methods included in the list from the list. In this regard, it is assumed that the user is aware of the encryption method employed in the selected wireless network; therefore, it is not necessary that the control unit 110 attempts to establish connection by use of the other encryption methods. According to the present embodiment, steps S402-S406 are executed when the list of unattempted encryption methods includes a plurality of encryption methods. That is, according to the embodiment as shown in FIG. 7, when the authorization method to be used in the attempt to establish connection is either WPA-PSK or open authorization method.

In S400, if the list of unattempted encryption methods includes solely one unattempted authorization method remaining (S400: YES), in S410, the control unit 110 adopts the remaining encryption method and removes the encryption method from the list. Thus, the list becomes blank. When the user selects the authorization method "LEAP" or "Shared-key" according to the user interface presented in S302, or when the authorization method "LEAP" or "Shared-key" is automatically selected by the option <Auto select> according to the user interface presented in S306, the control unit 110 determines that solely one unattempted encryption method (i.e., "CKIP" or "WEP") is included in the list of unattempted encryption methods created in S208 (FIG. 6). When the user selects the authorization method "WPA-PSK" or "open" according to the user interface presented in S302, or when the authorization method "AES" or "WEP" is automatically selected by the option <Auto select> according to the user interface presented in S406, the flow proceeds to S232 (FIG. 6) and returns to S210. Thereafter, in S212, the encryption adopting process is repeated. Thus, the control unit 110 determines that solely one unattempted encryption method is remaining in the list of unattempted encryption methods in S400. The encryption method adopting process ends following any of S406, S408, and S410. The control unit 110 returns to the flow shown in FIG. 6.

Following S212, in S214, the control unit 110 examines as to whether the wireless connection by use of the authorization method adopted in the authorization method adopting process in S206 and the encryption method adopted in the encryption method adopting process S212 requires any additional parameter. In this regard, wireless connection by use of the set of "LEAP and CKIP" requires parameters of a user ID and a password. The wireless connection by use of the set of "WPA-PSK and AES" or "WPA-PSK and TKIP" requires a passphrase called a pre-shared key. When a set includes the encryption method "WEP," the wireless connection by use of the set requires a passphrase called a WEP key. When the set of "open and none" is used in the attempt to establish connection, no additional parameter is required. Accordingly, in S214, when the set of authorization method and encryption method "open and none" is adopted, it is determined that no additional parameter is required (S214: NO), and the flow proceeds to S216. When a set of authorization method and encryption method other than "open and none" is adopted, it is determined that an additional parameter is required to establish connection (S214: YES). The flow proceeds to S218.

In S216, the control unit 110 attempts to establish connection with the wireless network identified by the SSID, selected by the user in S104 or entered by the user in S106, by use of the authorization method adopted in S206 and the encryption method adopted in S212. In particular, the set "open and none" is used in the attempt to establish connection. The flow proceeds to S230.

In S218, the control unit 110 examines the list of unattempted authorization methods and the list of unattempted encryption methods to determine as to whether the lists are both blank. In this regard, the list of unattempted authorization list is blank if the flow has experienced S308 or S310 in the authorization method adopting process shown in FIG. 8 prior to the examination in S218. Further, the list of unattempted encryption list is blank if the flow has experienced S408 or S410 in the encryption method adopting process shown in FIG. 9 prior to the examination in S218. When not both of the lists are blank, i.e., at least one of the lists includes remaining unattempted method (S218: NO), in S220, the control unit 110 presents a user interface for entering a parameter required for the set of authorization method and encryption method to the user through the display unit 170. In this regard, the control unit 110 presents the option <Prefer different method> to the user so that the user can abandon the set of the authorization method selected in S206 and the encryption method S212 and select a different set. In S222, the control unit 110 examines as to whether the option <Prefer different method> is entered. When the option <Prefer different method> is not entered (S222: NO), the flow proceeds to S226. When the option <Prefer different method> is entered (S222: YES), the flow returns to S210. FIGS. 3D, 3F, 3I, and 4E are illustrative views of the user interface presented in S220 for entering the parameter.

Figure 8:
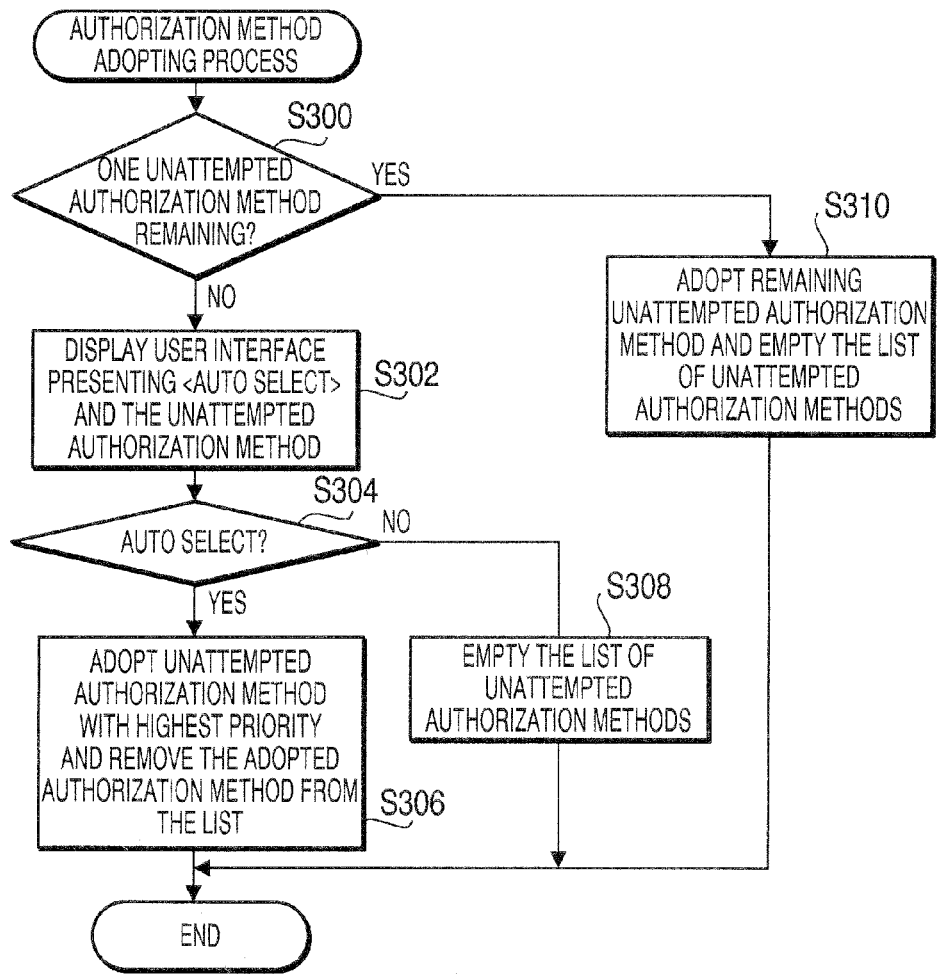
FIG. 8 is a flowchart to illustrate a flow of an authorization method adopting process according to the embodiment of the present invention.
Figure 9:
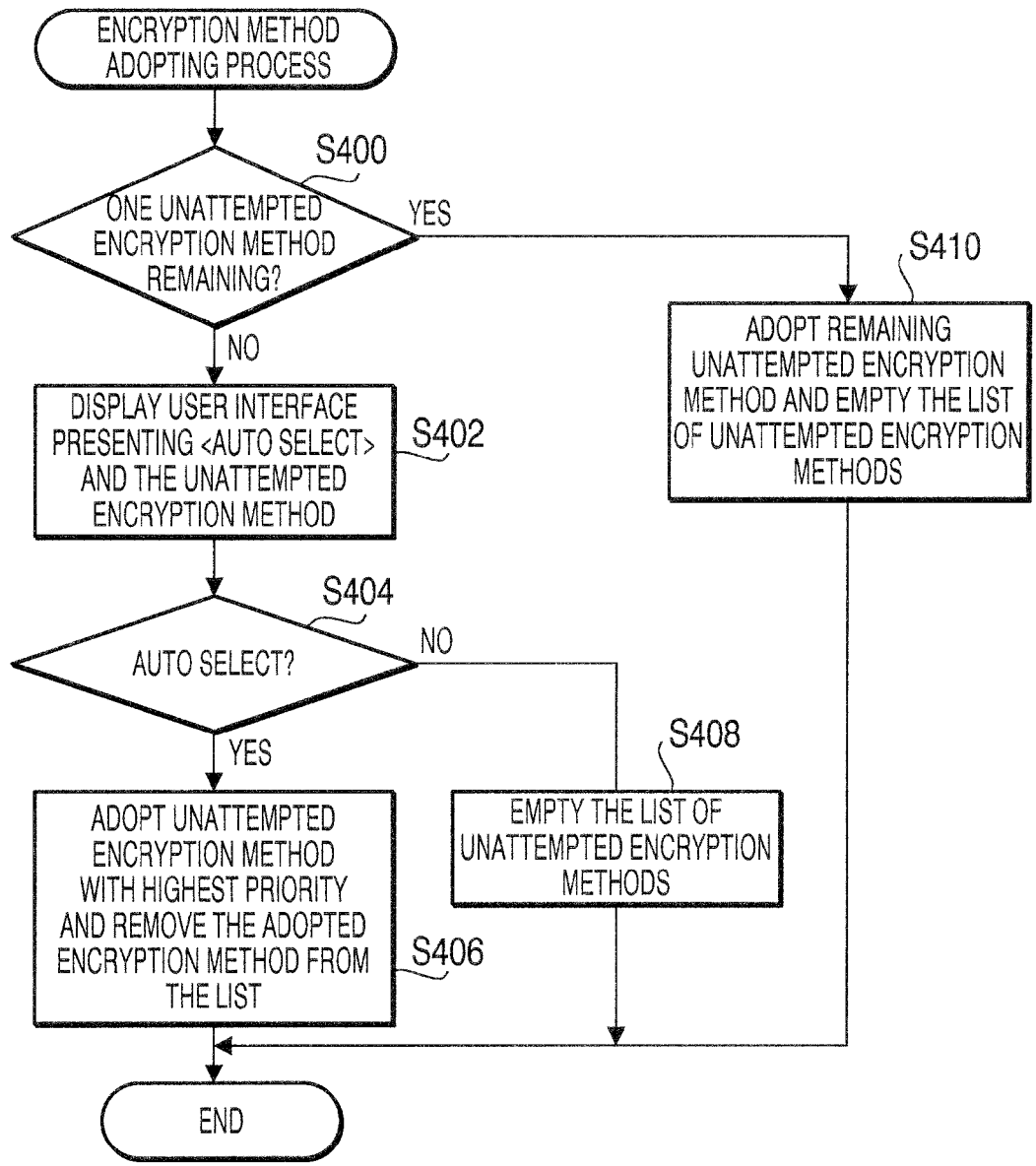
FIG. 9 is a flowchart to illustrate a flow of an encryption method adopting process according to the embodiment of the present invention.

The user interface shown in FIG. 3D is presented when, for example, the authorization method "LEAP" is automatically adopted in S306 (FIG. 8) and the encryption method "CKIP" is adopted in S410 (FIG. 9). The "different method" suggested by the option <Prefer different method> refers to a set of authorization method and encryption method including the authorization method "WPA-PSK." (See FIG. 3E.)

The user interface shown in FIG. 3F is presented when, for example, the encryption method "AES" is selected through the user interface shown in FIG. 3E. In this regard, the user interface shown in FIG. 3F is presented in response to the selection of "AES" (S404: NO) through the user interface presented in S402 (FIG. 9). Alternatively, the user interface shown in FIG. 3F is presented when the option <Auto select> is selected through the user interface shown in FIG. 3E (S404: YES), and when the encryption method "AES" is automatically adopted in S406. The "different method" suggested by the option <Prefer different method > refers to the set of "WPA-PSK and TKIP."

The user interface shown in FIG. 3I is presented when, for example, the option <Prefer different method> is entered through the user interface shown in FIG. 3F. In particular, the user interface is presented when the authorization method "WPA-PSK" is automatically adopted in S306 and the encryption method "TKIP" is adopted in S410. Alternatively, the user interface is presented when the option <Next> is entered through the user interface shown in FIG. 3H. In particular, prior to the presentation of the user interface shown in FIG. 3H, the passphrase was entered through the user interface shown in FIG. 3F, establishment of connection was attempted by use of the set "WPA-PSK and AES" (S226), the attempt failed (S230: NO), the flow proceeded to S232 and returned to S210, the control unit 110 repeated the encryption method adopting process in S212, and the encryption method "TKIP" was selected in S410. The "different method" suggested by the option <Prefer next method> refers to the set of "Shared-key and WEP."

The user interface shown in FIG. 4E is presented when, for example, one of the option <Auto select> and the encryption method "AES" is selected through the user interface shown in FIG. 4D. In particular, prior to the presentation of the user interface shown in FIG. 4E, the authorization method "WPA-PSK" was selected through the user interface presented in S302 (S304: NO) (see FIG. 4C), and the encryption method "AES" was selected in S404 or in S406 following entry of the option <Auto select> in S404. The "different method" suggested by the option <Prefer next method> refers to the set of "WPA-PSK and TKIP."

Description of S218 is continued. In S218, the control unit 110 examines the list of unattempted authorization methods and the list of unattempted encryption methods to determine as to whether the lists are both blank. When both of the lists are blank, i.e., the lists include no remaining unattempted method (S218: YES), in S224, the control unit 110 presents a user interface for entering a parameter required for the set of authorization method and encryption method to the user through the display unit 170. In this regard, the option <Prefer different method> is not presented. FIG. 4H is an illustrative view of the user interface presented in S224 for entering the parameter. The user interface shown in FIG. 4H is presented when, for example, the user selected the authorization method "WPA-PSK" through the user interface presented in S302 (see FIG. 4C), and the encryption method "TKIP" was adopted in S406. Alternatively, the user interface is presented when the user selected the authorization method "WPA-PSK" through the user interface presented in S302, and the encryption method "AES" was adopted in S406, the attempt to establish connection by use of the selected set "WPA-PSK and AES" (S230: NO) (see FIG. 4G), the flow proceeded to S232 and repeated S210, and S410 was repeated in the encryption method adopting process in S212.

In a first case, in which the list of unattempted authorization methods is not blank and the list of unattempted encryption methods is not blank (S218: NO), in S220, the option <Prefer different method> is presented. When the option <Prefer different method> is entered by the user (S222: YES), in S212, a next unattempted encryption method is adopted. In a second case, in which the list of unattempted authorization methods is not blank but the list of unattempted encryption method is blank (S218: NO), in S220, the option <Prefer different method> is presented. When the option <Prefer different method> is entered by the user (S222: YES), the flow returns to S210 (S210: YES) and to S202 (S202: NO), and in S206, a next unattempted authorization method is adopted. In a third case, in which the list of unattempted authorization methods and the list of unattempted encryption methods are both blank (S218: YES), no authorization method or encryption method remains unattempted. Therefore, in S224, the option <Prefer different method> is not presented.

In S226, the control unit 110 attempts to establish connection with the wireless network identified by the SSID, selected by the user in S104 or entered by the user in S106, by use of the authorization method adopted in S206, the encryption method adopted in S212, and the parameter entered in S220 or in S224. The flow proceeds to S230. FIGS. 3G, 3J, 4F, and 4I are illustrative views of the user interface presented in S226.

In S230, the control unit 110 examines as to whether connection with the wireless network attempted in S216 or in S226 is established. When the attempt fails (S230: NO), in S232, the control unit 110 displays a message indicating the failure of the attempt by use of the selected set of authorization method and encryption method in the display unit 170 (see FIGS. 3H and 4G). When, for example, the attempt to establish the connection with the wireless network indicated in the user interface shown in FIG. 3G fails, the user interface shown in FIG. 3H is presented to the user through the display unit 170. For another example, when the attempt to establish connection with the wireless network indicated in the user interface shown in FIG. 4F fails, the user interface shown in FIG. 4G is presented to the user through the display unit 170. When, on the other hand, the connection is established (S230: YES), in S234, a message indicating the successful establishment of the connection is displayed in the display unit 170 (see FIG. 4J). When the user recognizes the establishment of connection through the user interface shown in FIG. 4J and enters confirmation (e.g., operation to an <OK> indication presented in the user interface shown in FIG. 4J), the wireless settings (i.e., the authorization method, the encryption method, and the additional parameter (if any)) used in the successful attempt to establish connection with the wireless network are saved in the storage unit 130.

In the MFP 100 according to the above embodiment, when the authorization method and the encryption method are selected, the option <Auto select> is presented to the user through the display unit 170 (S302 in FIG. 8 and S402 in FIG. 9). Therefore, even when the user is unaware of or unfamiliar with the authorization method and the encryption method employed in the wireless network, adoptions can be made automatically so that the operation to establish connection with the wireless network can be continued without being interrupted by the unawareness. Thus, connection with the wireless network can be established promptly.

Next, a first modified embodiment of the present invention will be described. In the first modified embodiment, the PC 200 connected to the MFP 100 through the USB interfaces 180, 250 can be utilized in, for example, entering the user's instruction to activate the flow of attempt to establish connection with the wireless network, selections of the SSID of the wireless network, the authorization method, the encryption method, and the parameter to be used in the attempt to establish connection with the wireless network. In the first modified embodiment, the flow starts when a predetermined program 224, which is installed in the storage unit 220 of the PC 200, is activated according to the user's instruction.

When the flow starts, the control unit 210 of the PC 200 presents predetermined information to the user through the display unit 240. According to the information, the user inputs an instruction for the MFP 100 to search for the wireless networks through the operation unit 230 of the PC 200. The control unit 210 obtains the instruction and transmits the instruction to the MFP 100 through the USB interface 250.

The control unit 110 of the MFP 100 receives and obtains the instruction through the USB interface 180. Thereafter, the control unit 110 executes an operation identical to the operation in S100 (FIG. 5). Thereafter, the control unit 110 of the MFP 100 transmits the list of SSIDs identifying the detected wireless networks to the PC 200. The control unit 210 of the PC 200 receives the list and presents the user interface including the list of SSIDs to the user through the display unit 240. In this regard, the user interface presented to the user is identical to the user interfaces shown in FIGS. 3B and 4B. Further, the control unit 210 executes operations identical to the operations in S104 and S106.

Figure 6:
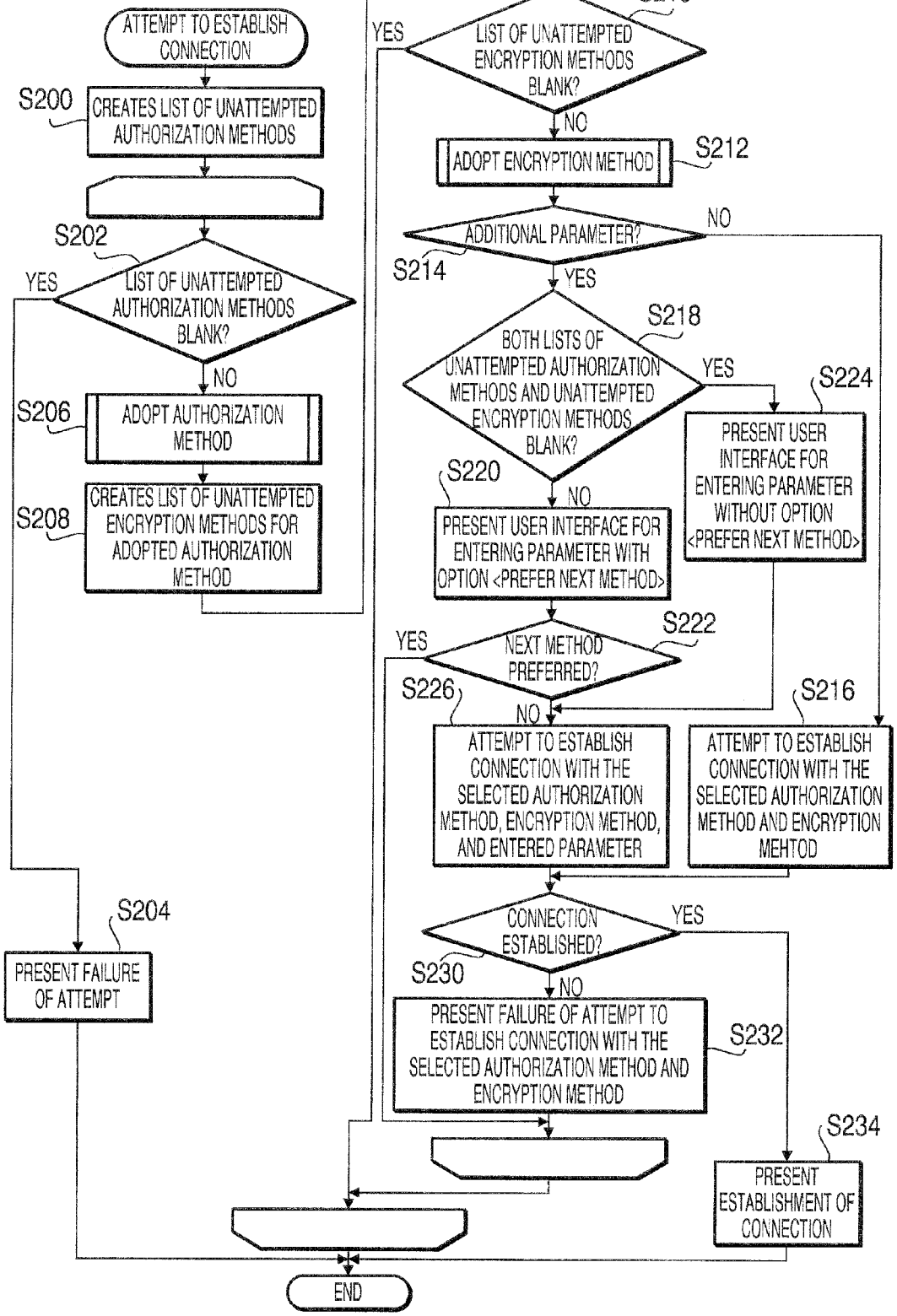
FIG. 6 is a flowchart to illustrate a detailed flow of an attempt to establish connection between the MFP 100 and the access point 300A within the network system 10 according to the embodiment of the present invention.

The control unit 210 of the PC 200 further executes an operation similar to the operation in S108 (see also FIGS. 6, 7, and 8). In this regard, however, the control unit 210 passes the adopted authorization method and encryption method, and the additional parameter (if any) to the MFP 100 through the USB interface 250 along with a connection request to the MFP 100 so that the MFP 100 will attempt to establish connection with the wireless network by use of the adopted authorization method, encryption method, and the additional parameter (if any). The control unit 110 of the MFP 100 receiving the request attempts to establish connection with the wireless network identified by the SSID, selected by the user in the operation corresponding to S104 or entered by the user in the operation corresponding to S106, by use of the authorization method, the encryption method, and the parameter (if any). Result of the attempt is transmitted to the PC 200 through the USB interface 180. The control unit 210 of the PC 200 receives the result and presents a user interface indicating the result to the user through the display unit 240 (see S232 and S234 in FIG. 5).

According to the above configuration of the first modified embodiment, the user's selection of the SSID, the authorization method, the encryption method, and the password can be entered through the operation unit 240 of the PC 200, which has improved operability than the operation unit 160 of the MFP 100. Further, the detected SSIDs and the result of the attempts to establish connection are presented to the user through the display unit 240 of the PC 200, which has better visibility than the display unit 170 of the MFP 100.

Next, a second modified embodiment will be described. In the above embodiments, the sets of authorization methods and encryption methods applicable to the MFP 100 are defined as shown in FIG. 7. However, partially or entirely different sets of authorization methods and encryption methods can be defined to be usable in the MFP 100. For example, sets of authorization methods and encryption methods: "WPA-PSK and AES," "WPA-PSK and TKIP," "Open and WEP," and "Open and none" can be used.

As the flow proceeds in the MFP 100, in S104 or in S106, the SSID identifying the wireless network to be connected with the MFP 100 is selected. Further, in S200 (FIG. 6), a list of unattempted authorization methods including "WPS-PSK" and "open" is created. In S302 (FIG. 8), the control unit 110 displays a user interface presenting the authorization methods "WPS-PSK" and "open" and the option <Auto select> in the display unit 170. When the user enters the option <Auto select> (S304: YES), in S306, the control unit 110 adopts the authorization method "WPS-PSK" which has the priority of higher level. Thereafter, in S208 (FIG. 6), the control unit 110 creates a list of unattempted encryption methods including "AES" and "TKIP," which are applicable encryption methods for the authorization method "WPS-PSK." Thereafter, in S402 (FIG. 9), the control unit 110 displays a user interface presenting the encryption methods "AES" and "TKIP" and the option <Auto select> in the display unit 170.

When the user enters the option <Auto select> (S404: YES), the control unit 110 adopts the encryption method "AES" having the priority level being higher in S406. Thereafter, in S226 (FIG. 6), the control unit 110 attempts to establish connection with the wireless network identified by the SSID, selected by the user in S104 or entered by the user in S106, by use of the authorization method "WPA-PSK", the encryption method "AES", and the passphrase entered in S220. When the attempt fails (S230: NO), in S410, the control unit 110 adopts the encryption method "TKIP" and in S226 attempts to establish connection. When the attempt fails (S230: NO), in S310, the control unit 110 automatically adopts the authorization method "open," and in S402, the control unit 110 displays a user interface presenting the encryption methods "WEP" and "none" and the option <Auto select>.

When the user enters the option <Auto select> (S404: YES), the control unit 110 adopts the encryption method "WEP" with the priority level of higher than "none" in S406. Thereafter, in S226, the control unit 110 attempts to establish connection by use of the authorization method "open" and the encryption method "WEP." When the attempt fails (S230: NO), in S410, the control unit 110 adopts the encryption method "none" and in S216, attempts to establish connection with the authorization method "open" and the encryption method "none." When the attempt fails (S230: NO), the control unit 110 executes S204 and terminates the flow. When the connection is established (S230: YES), the control unit 110 executes S234 and terminates the flow.

According to the second modified embodiment, the user can select the option <Auto select> when entry of the encryption method is required as well as the option <Auto select> for selecting the authorization method. Therefore, when each authorization method applicable to the MFP 100 supports a plurality of encryption methods, the user may not necessarily make affirmative selection to select a specific one of the available authorization methods or encryption methods. Rather, the user may have the control unit 110 to automatically select the available authorization method and encryption method in turn until no authorization method or encryption method remains unattempted.

Although examples of carrying out the invention has been described, those skilled in the art will appreciate that there are numerous variations and permutations of the wireless communication device, the method and the computer usable medium storing computer readable instructions to connect the wireless communication device that fall within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

What is claimed is:

1. A method to be applied to a wireless communication device in order to connect the wireless communication device to an intended wireless network, comprising:
   a first step, in which options of authorization methods to be used for establishing connection between the wireless communication device and the wireless network are presented to be selectable to a user, the options including a first authorization item representing a first authorization method, a second authorization item representing a second authorization method, and a third authorization item not specifying any authorization method;
   a second step, in which the first authorization method is automatically selected if the option of the third authorization item is selected by the user;
   a third step, in which options of encryption methods corresponding to the selected first authorization method are presented to be selectable to the user, the options including a first encryption item representing a first encryption method, a second encryption item representing a second encryption method, and a third encryption item not specifying any encryption method;
   a fourth step, in which the first encryption method is automatically selected if the third encryption item is selected by the user;
   a fifth step, in which establishment of the connection is attempted by use of the selected first authorization method and the selected first encryption method;
   a sixth step, in which the second encryption method is automatically selected alternatively to the first encryption method if the attempt to establish connection between the wireless communication device and the wireless network by use of the first authorization method and the first encryption method fails: and
   a seventh step, in which establishment of the connection is attempted by use of the selected first authorization method and the selected second encryption method.

2. The method according to claim 1, further comprising:
   an eighth step, in which the second authorization method is automatically selected alternatively to the first authorization method if the attempt to establish connection between the wireless communication device and the wireless network by use of the first authorization method and the second encryption method fails; a ninth step, in which a third encryption method corresponding to the second authorization method is automatically selected; and a tenth step, in which establishment of the connection is attempted by use of the selected second authorization method and the selected third encryption method.

3. The method according to claim 1,
   wherein security of the first authorization method is higher than security of the second authorization method; and
   wherein security of the first encryption method is higher than security of the second encryption method.

4. The method according to claim 1, wherein the fifth step includes a step, in which the selected first authorization method and the selected first encryption method are outputted to be recognizable to the user as a set to be used in the attempt to establish the connection, and the first authorization method and the second encryption method are presented to be selectable to the user as an alternative option to be used in the attempt to establish the connection prior to the attempt to establish the connection.

5. A wireless communication device to be connected to an intended wireless network, comprising:
   a processor configured to execute computer readable instructions to provide:
   an authorization method outputting unit configured to output options of authorization methods to be used for establishing connection with the wireless network to be selectable to a user, the options including a first authorization item representing a first authorization method, a second authorization item representing a second authorization method, and a third authorization item not specifying any authorization method;
   an authorization method selecting unit configured to automatically select the first authorization method if the option of the third authorization item is selected by the user;
   an encryption method outputting unit configured to output options of encryption methods corresponding to the selected first authorization method to be selectable to the user, the options including a first encryption item representing a first encryption method, a second encryption item representing a second encryption method, and a third encryption item not specifying any encryption method;
   an encryption method selecting unit configured to automatically select the first encryption method if the third encryption item is selected by the user; and
   a connecting unit configured to attempt to establish the connection with the wireless network by use of the selected first authorization method and the selected first encryption method;
   wherein the encryption method selection unit automatically selects the second encryption method alternatively to the first encryption method if the attempt to establish connection between the wireless communication device and the wireless network by use of the first authorization method and the first encryption method fails; and
   wherein the connecting unit attempts to establish the connection with the wireless network device by use of the selected first authorization method and the alternatively selected second encryption method.

6. A non-transitory computer usable medium comprising computer readable instructions to control a wireless communication device to be connected to an intended wireless network by executing:
   a first step, in which options of authorization methods to be used for establishing connection between the wireless communication device and the wireless network are presented to be selectable to a user, the options including a first authorization item representing a first authorization method, a second authorization item representing a second authorization method, and a third authorization item not specifying any authorization method;
   a second step, in which the first authorization method is automatically selected if the option of the third authorization item is selected by the user;
   a third step, in which options of encryption methods corresponding to the selected first authorization method are presented to be selectable to the user, the options including a first encryption item representing a first encryption method, a second encryption item representing a second encryption method, and a third encryption item not specifying any encryption method;
   a fourth step, in which the first encryption method is automatically selected if the third encryption item is selected by the user;

a fifth step, in which establishment of the connection is attempted by use of the first selected authorization method and the selected first encryption method;

a sixth step, in which the second encryption method is automatically selected alternatively to the first encryption method if the attempt to establish connection between the wireless communication device and the wireless network by use of the first authorization method and the first encryption method fails; and a seventh step, in which establishment of the connection is attempted by use of the selected first authorization method and the selected second encryption method.

* * * * *